(12) United States Patent
Viswanath et al.

(10) Patent No.: US 11,127,031 B1
(45) Date of Patent: Sep. 21, 2021

(54) SYSTEMS AND METHODS FOR PROVIDING DIMENSIONAL PROMOTIONAL OFFERS

(71) Applicant: GROUPON, INC., Chicago, IL (US)

(72) Inventors: Sridatta Viswanath, Palo Alto, CA (US); Amber Roy Chowdhury, Bellevue, WA (US); Roger Henry Castillo, Palo Alto, CA (US); Sri Subramaniam, San Jose, CA (US); Lawrence Lee Wai, Mountain View, CA (US); Bhupesh Bansal, Sunnyvale, CA (US); Vijay Kumar, Saratoga, CA (US)

(73) Assignee: Groupon, Inc., Chicago, IL (US)

(*) Notice: Subject to any disclaimer, the term of this patent is extended or adjusted under 35 U.S.C. 154(b) by 0 days.

(21) Appl. No.: 16/555,892

(22) Filed: Aug. 29, 2019

Related U.S. Application Data

(63) Continuation of application No. 14/788,479, filed on Jun. 30, 2015, now Pat. No. 10,438,229.

(60) Provisional application No. 62/019,214, filed on Jun. 30, 2014.

(51) Int. Cl.
G06Q 30/02 (2012.01)

(52) U.S. Cl.
CPC ..... G06Q 30/0243 (2013.01); G06Q 30/0249 (2013.01); G06Q 30/0252 (2013.01); G06Q 30/0261 (2013.01); G06Q 30/0264 (2013.01)

(58) Field of Classification Search
CPC ..................................................... G06Q 30/02
See application file for complete search history.

(56) References Cited

U.S. PATENT DOCUMENTS

| | | | |
|---|---|---|---|
| 2001/0014868 A1* | 8/2001 | Herz | G06Q 30/02 705/14.38 |
| 2007/0094066 A1* | 4/2007 | Kumar | G06Q 30/06 706/61 |
| 2007/0156513 A1 | 7/2007 | Mastrianni et al. | |
| 2009/0327151 A1 | 12/2009 | Carlson et al. | |
| 2010/0094710 A1* | 4/2010 | Ramakrishna | G06Q 30/0241 705/14.64 |
| 2010/0217525 A1 | 8/2010 | King et al. | |
| 2010/0312624 A1 | 12/2010 | Bilenko | |
| 2013/0066714 A1 | 3/2013 | Umeda | |
| 2014/0143058 A1* | 5/2014 | Lessin | G06Q 30/0261 705/14.58 |

* cited by examiner

*Primary Examiner* — Vincent M Cao
(74) *Attorney, Agent, or Firm* — Alston & Bird LLP

(57) ABSTRACT

Systems and related methods of providing promotional offers to consumers are discussed herein. Some embodiments may provide for an apparatus including circuitry configured to provide promotional offers to consumers based on dimensions representing criteria by which promotions may be deemed relevant to a consumer. Some examples of dimensions may include location, time, environment, price, and/or consumer preference. Based on receiving signals from the consumer device, among other sources, indicating associated times, locations, and other characteristics of consumer activity, the apparatus may recognize patterns or trends in consumer behavior, and use such information to predict or influence future consumer behavior.

20 Claims, 5 Drawing Sheets

SYSTEMS AND METHODS FOR PROVIDING DIMENSIONAL PROMOTIONAL OFFERS

This application is a continuation application of U.S. patent application Ser. No. 14/788,479 filed Jun. 30, 2015, titled "Systems and Method For Providing Dimensional Promotional Offers," which claims the benefit of U.S. Provisional Patent Application No. 62/019,214, titled "Systems and Methods For Providing Dimensional Promotional Offers," filed Jun. 30, 2014, each of which are incorporated by reference herein in their entirety.

FIELD

Embodiments of the invention relate, generally, to techniques for providing promotional offers to consumers, such as to consumers carrying mobile consumer devices.

BACKGROUND

Promotional systems provide promotions associated with merchants to consumer devices. Providing targeted promotional offers to consumers may result in greater consumer acceptance of such offers. In this regard, areas for improving current techniques have been identified.

BRIEF SUMMARY

Through applied effort, ingenuity, and innovation, solutions to improve such systems have been realized and are described herein. Some embodiments may provide for a system configured to provide offers of promotions to consumers, or "impressions." In some embodiments, the system may be further configured to provide promotion bundles. For example, the system may include an apparatus, comprising circuitry configured to: access promotion data defining promotions; determine one or more dimension values associated with a consumer; determine a dimension score of a promotion for each of the one or more dimension values for the promotion and the promotion data, wherein the dimension score for a dimension value indicates an amount that the promotion satisfies with the dimension value; determine a multi-dimension score for the promotion based on the dimension scores associated with the one or more dimension values; rank the promotions based on the multi-dimension score and one or more other multi-dimension scores associated with one or more other promotions; generate an impression indicating one or more promotions based on the ranking; and provide the impression to a consumer device.

In some embodiments, the circuitry configured to determine the one or more dimension values may include the circuitry being configured to determine a time dimension value associated with the consumer; and the circuitry configured to determine the dimension score for each of the one or more dimension values may include the circuitry being configured to determine a time dimension value score based on comparing the time dimension value with a redemption time of the promotion. In some embodiments, the time dimension value may be based on at least one of a current time or a future time.

In some embodiments, the circuitry configured to determine the one or more dimension values may include the circuitry being configured to determine a location dimension value associated with the consumer; and the circuitry configured to determine dimension score may include the circuitry being configured to determine a location dimension value score based on comparing the time dimension value with a redemption location of the promotion.

In some embodiments, the location dimension value may be a based on at least one of a current location and a future location of the consumer. In some embodiments, the location dimension value may be a based on a current location of the consumer; and the circuitry may be further configured to determine the current location of the consumer based on one or more of: receiving location data from the consumer device; or receiving consumer device presence data from a communication beacon or merchant device.

In some embodiments, the circuitry configured to determine the one or more dimension values may include the circuitry being configured to determine an environmental dimension value associated with the consumer; and the circuitry configured to determine dimension score may include the circuitry being configured to determine an environmental dimension value score based on comparing the environmental dimension value with an environmental parameter of the promotion. In some embodiments, the environmental dimension value may be based on at least one of at least one of: receiving real-time weather data from the consumer device; or receiving forecasted weather data from a third party system.

In some embodiments, the circuitry configured to determine the one or more dimension values may include the circuitry being configured to determine a price dimension value associated with the consumer; and the circuitry configured to determine dimension score may include the circuitry being configured to determine a price dimension value score based on comparing the price dimension value with an accepted value of the promotion.

In some embodiments, the circuitry configured to determine the one or more dimension values may include the circuitry being configured to determine a consumer preference dimension value associated with the consumer, wherein the consumer preference dimension value defines a persona; and the circuitry configured to determine dimension score may include the circuitry being configured to determine a consumer preference dimension value score based on comparing preferences associated with the persona with characteristics of an item of the promotion. In some embodiments, the consumer preference dimension value may be determined based on a current time and a current location associated with the consumer device.

In some embodiments, the circuitry may be further configured to generate the persona based on tracking the location of the consumer device over time. In some embodiments, the circuitry may be further configured to generate the persona based on tracking the at least one of item purchase history and promotion purchase history over time.

Some embodiments may include a machine-implemented method, comprising, by processing circuitry of an apparatus: accessing promotion data defining promotions; determining one or more dimension values associated with a consumer; determining a dimension score of a promotion for each of the one or more dimension values for the promotion and the promotion data, wherein the dimension score for a dimension value indicates an amount that the promotion satisfies with the dimension value; determining a multi-dimension score for the promotion based on the dimension scores associated with the one or more dimension values; ranking the promotions based on the multi-dimension score and one or more other multi-dimension scores associated with one or more other promotions; generating an impression indicating one or more promotions based on the ranking; and providing the impression to a consumer device.

In some embodiments, determining the one or more dimension values may include determining a time dimension value associated with the consumer; and determining the dimension score for each of the one or more dimension values may include determining a time dimension value score based on comparing the time dimension value with a redemption time of the promotion. In some embodiments, the time dimension value may be based on at least one of a current time or a future time.

In some embodiments, determining the one or more dimension values may include determining a location dimension value associated with the consumer; and determining the dimension score for each of the one or more dimension values may include determining a location dimension value score based on comparing the time dimension value with a redemption location of the promotion. In some embodiments, the location dimension value may be based on at least one of a current location and a future location of the consumer.

In some embodiments, the location dimension value may be based on a current location of the consumer; and the method may further include determining the current location of the consumer based on one or more of: receiving location data from the consumer device; or receiving consumer device presence data from a communication beacon or merchant device.

In some embodiments, the method may further include: determining the one or more dimension values includes determining an environmental dimension value associated with the consumer; and determining the dimension score for each of the one or more dimension values includes determining an environmental dimension value score based on comparing the environmental dimension value with an environmental parameter of the promotion. In some embodiments, the environmental dimension value may be based on at least one of at least one of: receiving real-time weather data from the consumer device; or receiving forecasted weather data from a third party system.

In some embodiments, determining the one or more dimension values may include determining a consumer preference dimension value associated with the consumer, wherein the consumer preference dimension value defines a persona; and determining the dimension score for each of the one or more dimension values may include determining a consumer preference dimension value score based on comparing preferences associated with the persona with characteristics of an item of the promotion.

In some embodiments, the consumer preference dimension value may be determined based on a current time and a current location associated with the consumer device.

In some embodiments, the method may further include, by the processing circuitry, generating the persona based on tracking the location of the consumer device over time. In some embodiments, the method may further include generating the persona based on tracking the at least one of item purchase history and promotion purchase history over time.

Some embodiments may include an apparatus including circuitry configured to: determine available promotions for inclusion within a promotion bundle; determine, based on the available promotions, one or more promotions of the promotion bundle; determine a bundle limit value defining a constraint on a dimension value of each of the one or more promotions; determine one or more promotions of the promotion bundle, wherein the dimension value of each of the one or more promotions collectively fail to exceed the bundle limit value; determine a bundle dimension score for the promotion bundle based on determining a multi-dimension score associated with each of the one or more promotions; and determine a ranking of promotion bundles based on comparing the bundle dimension score for the promotion bundle and one or more other bundle dimension scores associated with one or more other promotion bundles.

In some embodiments, wherein the circuitry may be further configured to receive an indication of the bundle limit value from the consumer device.

In some embodiments, the bundle limit value may define a constraint on one or more of: a price dimension value; a time dimension value; a location dimension value; an environmental dimension value; or a consumer preference dimension value.

In some embodiments, the circuitry may be further configured to: determine available items for inclusion within a promotion bundle; determine, based on the available items, one or more items of the promotion bundle; determine the bundle limit value defining a constraint on the dimension value of each of the one or more promotions and each of the one or more items; determine one or more items of the promotion bundle, wherein the dimension value of each of the one or more items and the one or more promotions collectively fail to exceed the bundle limit value; determine a bundle dimension score for the promotion bundle based on determining a multi-dimension score associated with each of the one or more promotions and the one or more items; and determine a ranking of promotion bundles based on comparing the bundle dimension score for the promotion bundle and one or more other bundle dimension scores associated with one or more other promotion bundles.

In some embodiments, the circuitry may be further configured to: generate an impression including one or more promotion bundles based on the ranking of the promotion bundles; and provide the impression to the consumer device.

Some embodiments may include a machine-implemented method, including, by processing circuitry of an apparatus: determining available promotions for inclusion within a promotion bundle; determining, based on the available promotions, one or more promotions of the promotion bundle; determining a bundle limit value defining a constraint on a dimension value of each of the one or more promotions; determining one or more promotions of the promotion bundle, wherein the dimension value of each of the one or more promotions collectively fail to exceed the bundle limit value; determining a bundle dimension score for the promotion bundle based on determining a multi-dimension score associated with each of the one or more promotions; and determining a ranking of promotion bundles based on comparing the bundle dimension score for the promotion bundle and one or more other bundle dimension scores associated with one or more other promotion bundles.

In some embodiments, the method may further include, by the processing circuitry, receiving an indication of the bundle limit value from the consumer device.

In some embodiments, the bundle limit value may define a constraint on one or more of: a price dimension value; a time dimension value; a location dimension value; an environmental dimension value; or a consumer preference dimension value.

In some embodiments, the method may further include, by the processing circuitry: determining available items for inclusion within a promotion bundle; determining, based on the available items, one or more items of the promotion bundle; determining the bundle limit value defining a constraint on the dimension value of each of the one or more promotions and each of the one or more items; determining one or more items of the promotion bundle, wherein the dimension value of each of the one or more items and the one or more promotions collectively fail to exceed the bundle limit value; determining a bundle dimension score for the promotion bundle based on determining a multi-dimension score associated with each of the one or more promotions and the one or more items; and determining a ranking of promotion bundles based on comparing the bundle dimension score for the promotion bundle and one or more other bundle dimension scores associated with one or more other promotion bundles.

In some embodiments, the method may further include, by the processing circuitry: generating an impression including one or more promotion bundles based on the ranking of the promotion bundles; and providing the impression to the consumer device.

Some embodiments may include an apparatus, including circuitry configured to: receive consumer information associated with a consumer account from a consumer device, the consumer information indicating a location of the consumer device; determine a time associated with the location of the consumer device; generate a time-based location profile of the consumer account indicating locations of the consumer device over time based at least in part on the location and the time; and generate a persona associated with the consumer account based on the time-based location profile, wherein the persona is associated with the location and time.

In some embodiments, the circuitry may be further configured to: receive second consumer information indicating an item purchased by the consumer from a remote device; determine, based on the consumer information, a purchase time of the item; determine whether the purchase time corresponds with the time; and in response to determining that the purchase time corresponds with the time: determine at least one of a category and theme associated with the item; and associate the at least one the category and them with the persona.

In some embodiments, the circuitry may be further configured to: receive second consumer information indicating an item purchased by the consumer from a remote device; determine, based on the consumer information, a purchase location of the item; determine whether the purchase location corresponds with the location; and in response to determining that the purchase location corresponds with the location: determine at least one of a category and theme associated with the item; and associate the at least one the category and theme with the persona.

Some embodiments may include a machine-implemented method, comprising, by processing circuitry of an apparatus: receiving consumer information associated with a consumer account from a consumer device, the consumer information indicating a location of the consumer device; determining a time associated with the location of the consumer device; generating a time-based location profile of the consumer account indicating locations of the consumer device over time based at least in part on the location and the time; and generating a persona associated with the consumer account based on the time-based location profile, wherein the persona is associated with the location and time.

In some embodiments, the method may further include, by the processing circuitry: receiving second consumer information indicating an item purchased by the consumer from a remote device; determining, based on the consumer information, a purchase time of the item; determining whether the purchase time corresponds with the time; and in response to determining that the purchase time corresponds with the time: determining at least one of a category and theme associated with the item; and associating the at least one the category and them with the persona.

In some embodiments, the method may further include, by the processing circuitry: receiving second consumer information indicating an item purchased by the consumer from a remote device; determining, based on the consumer information, a purchase location of the item; determining whether the purchase location corresponds with the location; and in response to determining that the purchase location corresponds with the location: determining at least one of a category and theme associated with the item; and associating the at least one the category and theme with the persona.

Some embodiments may include methods, while other embodiments may include circuitry and/or media configured to implement the methods and/or other functionality discussed herein. For example, one or more processors, and/or other machine components may be configured to implement the functionality discussed herein based on instructions and/or other data stored in memory and/or other non-transitory computer readable media.

These characteristics as well as additional features, functions, and details of various embodiments are described below. Similarly, corresponding and additional embodiments are also described below.

BRIEF DESCRIPTION OF THE DRAWINGS

Figure 1:
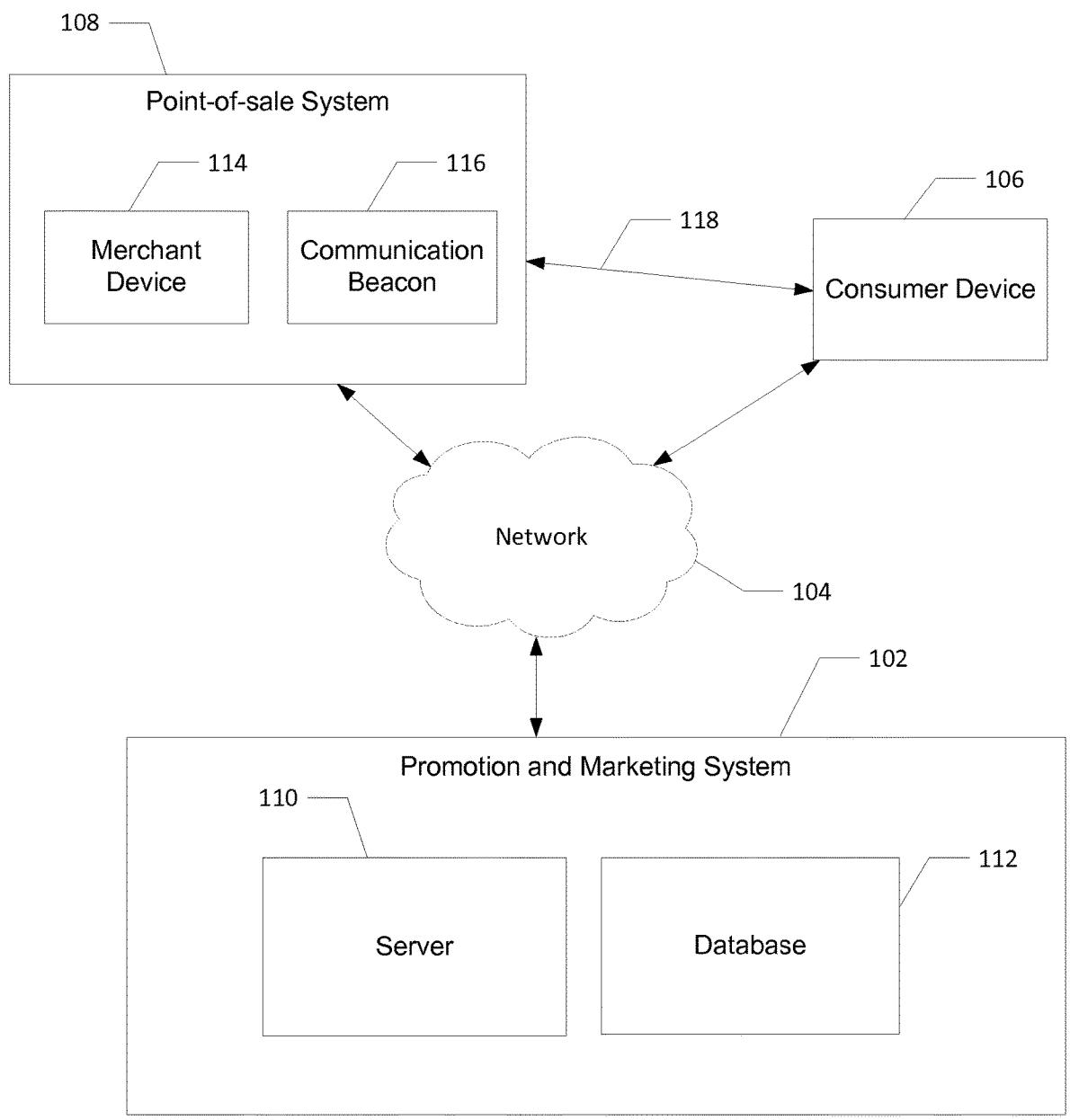
Figure 2:
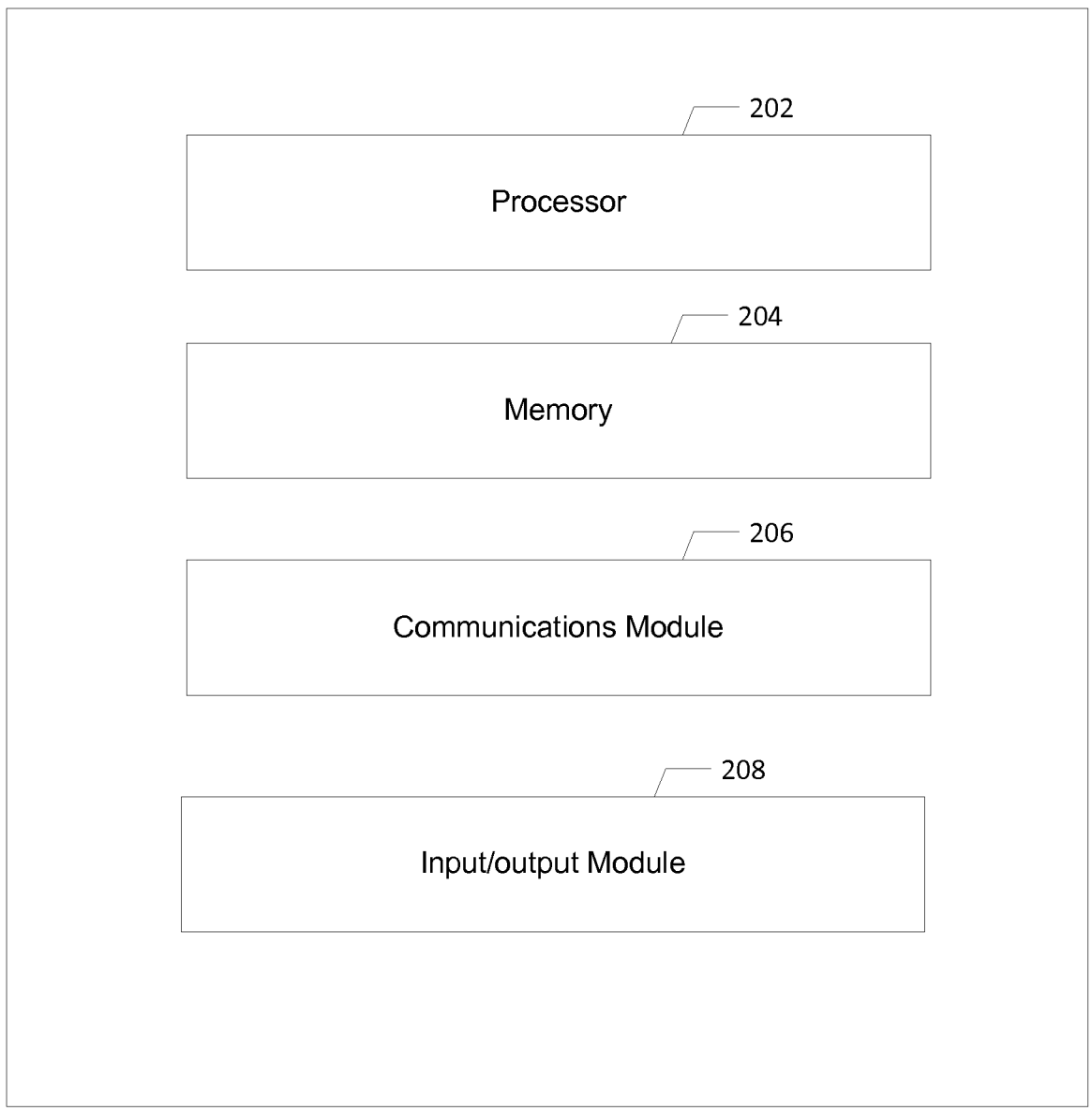
Figure 3:
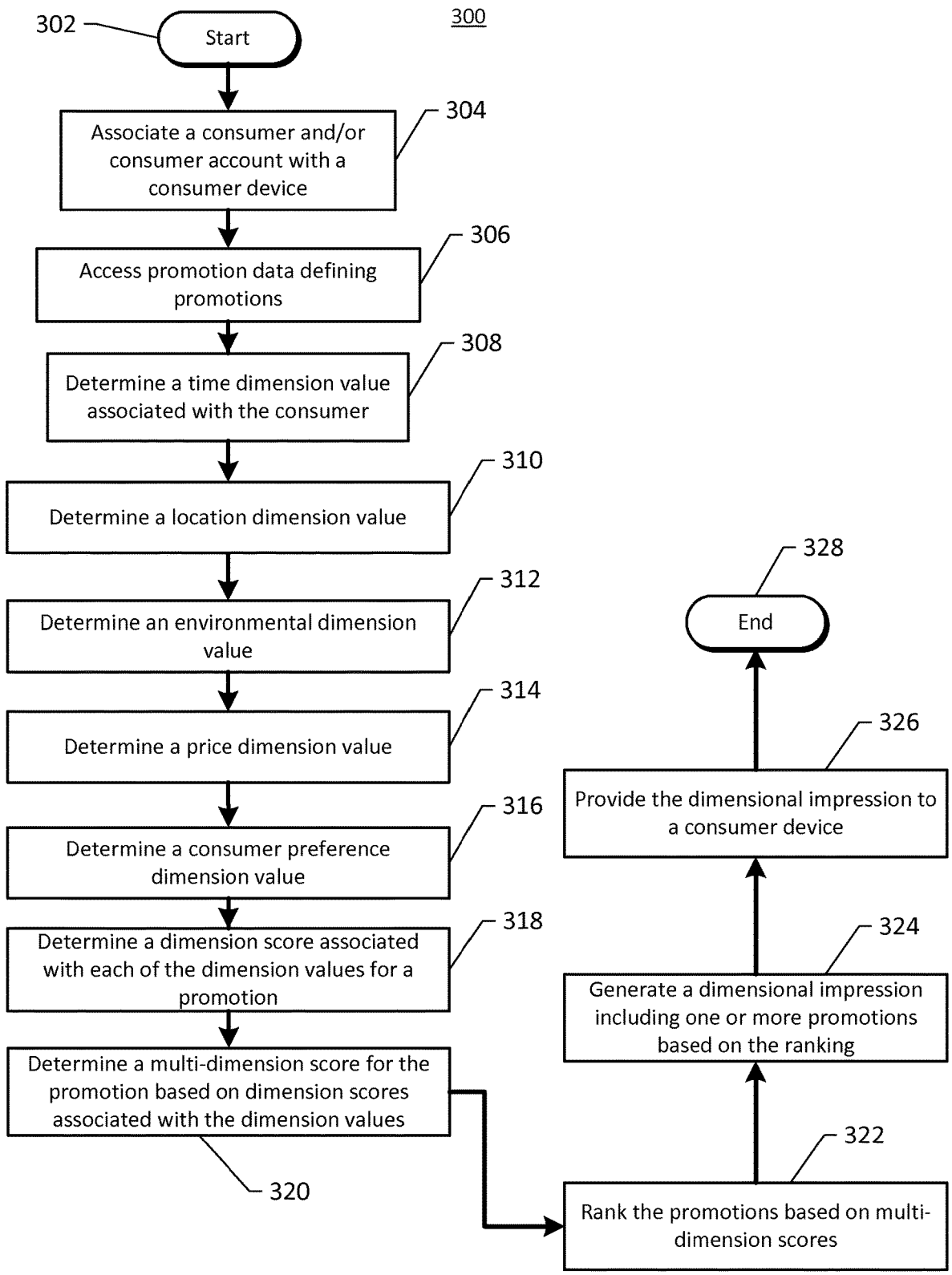
Figure 4:
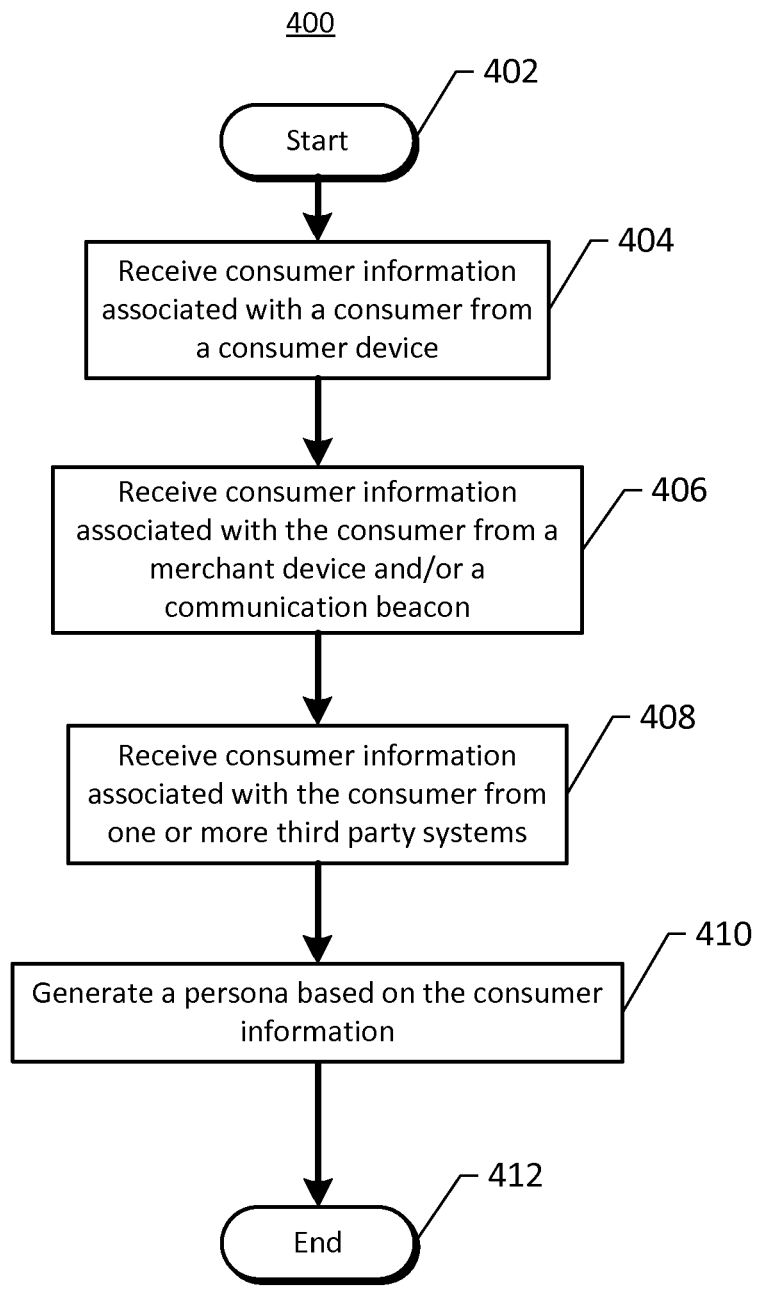
Figure 5:
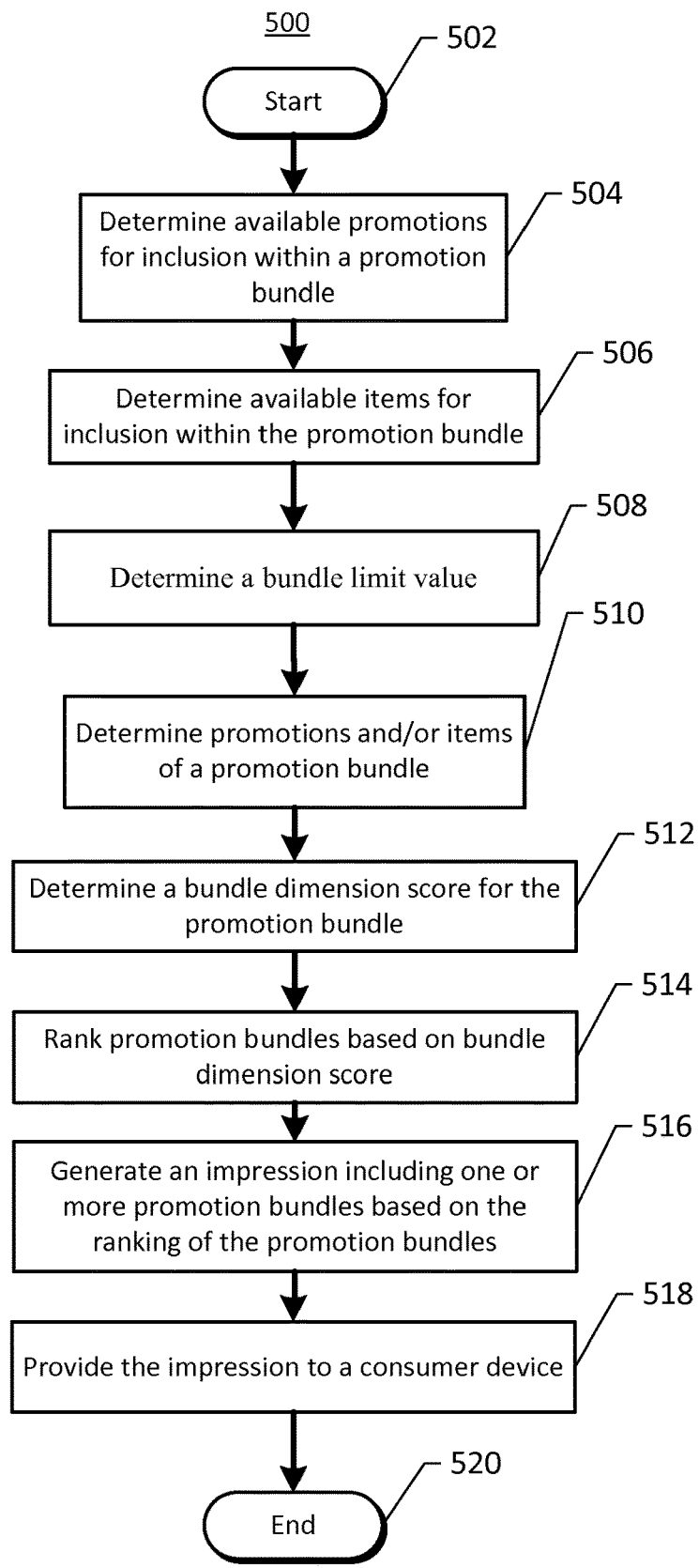

Having thus described some embodiments in general terms, reference will now be made to the accompanying drawings, which are not necessarily drawn to scale, and wherein:

FIG. 1 shows an example of a system in accordance with some embodiments;

FIG. 2 shows a schematic block diagram of example circuitry in accordance with some embodiments;

FIG. 3 shows an example of a method of providing an impression in accordance with some embodiments; and FIG. 4 shows an example of a method of generating a persona in accordance with some embodiments; and FIG. 5 shows an example of a method of providing a promotion bundle in accordance with some embodiments.

DETAILED DESCRIPTION

Embodiments now will be described more fully hereinafter with reference to the accompanying drawings, in which some, but not all embodiments are shown. Indeed, embodiments of the invention may be implemented in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

Overview

Some embodiments may provide for a central system (e.g., one or more servers) configured to provide a promotional and marketing service for one or more (e.g., multiple) merchants. In general, the system is capable of programmatically collecting data regarding consumers from various sources. The system may further recognize past consumers behaviors based on the collected data, and may further use such data to predict and/or influence future consumer behavior.

A "promotion," as used herein, may include, but is not limited to, any type of offered, presented or otherwise indicated reward, discount, coupon, credit, deal, incentive, discount, media or the like that is indicative of a promotional value or the like. In some embodiments, the purchase or acceptance of a promotion may result in the issuance of an instrument that may be used (e.g., redeemed) toward at least a portion of the purchase of particular goods, services and/or experiences (or "item," as used herein) defined by the promotion. For example, a promotion may specify that for a $25 accepted value paid by the consumer, the consumer may receive $50 toward a purchase of running shoes at a particular merchant.

A "merchant" or "provider" may include, but is not limited to, a merchant, provider of a promotion, business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce.

An "impression," as used herein, may include a communication, a display, or other perceived indication, such as a flyer, print media, e-mail, text message, application alert, mobile applications, other type of electronic interface or distribution channel and/or the like, of one or more promotions. In some embodiments, an impression including an indication of one or more promotions that are selected for presentation to a consumer based on one or more criteria, each of which may represent a dimension by which promotions may be deemed relevant to a consumer. A "dimension" as used herein refers to a criterion by which a promotion may be deemed relevant to a consumer. As discussed in further detail below, some examples of dimensions may include location, time, environment, price, and/or consumer preference. By gathering information about the consumer from various suitable sources as discussed herein, the consumer's "dimension value" along one or more dimensions (e.g., a location dimension value defining a targeted redemption, time dimension value defining a targeted redemption time, an environmental dimension value defining one or more targeted environmental factors, a price dimension value defining a targeted price or price range, and a consumer preference value defining a targeted preference, profile, or persona of the consumer) may be determined and compared with promotion parameters to provide (e.g., real-time) targeted impressions to the consumer.

In some embodiments, the system may be configured to rank promotions based on determining a "multi-dimension score" for each promotion. The multi-dimension score may represent an overall relevance or targeting score for the promotion. In some embodiments, the multi-dimension score may be determined based on or may be comprised of individual dimension scores associated with each dimension value for each dimension under consideration. For example, in some embodiments, the multi-dimension score may be determined based on a (e.g., weighted) sum, average, and/or other algorithmic transformation of dimension scores. In some embodiments, the system may be additionally or alternatively configured to provide promotion bundles including targeted promotions and/or items.

Exemplary System Architecture

FIG. 1 shows an example system 100 in accordance with some embodiments. System 100 may include promotion and marketing system 102 (or "system 102"), network 104, consumer device 106, and point-of-sale system 108. System 102 may be communicably connected with consumer device 106 and point-of-sale system 108 via network 104.

Point-of-sale system 108 may include merchant device 114 and communication beacon 116, which in various embodiments may be the same device or different devices. Point-of-sale system 108 may be associated with a merchant and may be located at a merchant shop. Although a single merchant device 114 and communication beacon 116 are shown, point-of-sale system 108 may include any number of merchant devices and/or communication beacons. In some embodiments, system 100 may further include multiple point-of-sale systems 108 that may be associated with various other merchants and/or merchant shops. In some embodiments, merchant device 114 may be configured to provide point-of-sale (POS) functionality for the merchant. Furthermore, merchant device 114 may be a stationary and/or mobile device. In some embodiments, merchant device 114 and/or communication beacon 116 may include circuitry configured to programmatically perform some or all of the methods discussed herein, such as methods 500-900 shown in FIGS. 5-9, respectively.

In some embodiments, system 100 may further include promotion and marketing system 102, which may further include server 110 and database 112. In some embodiments, system 102 may be configured to provide a promotion and marketing service that is accessible via one or more consumer devices and is operable to provide example promotion and/or marketing services on behalf of one or more merchants and/or providers. The promotion and marketing service maybe further be configured to illustrate or otherwise inform one or more consumers of the availability of one or more promotions in the form of one or more impressions. In some examples, the promotion and marketing service may also take the form of a redemption authority, a payment processor, a rewards provider, an entity in a financial network, a promoter, an agent and/or the like. As such, the service may, in some example embodiments, be configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

Server 110 may include circuitry, networked processors, etc. configured to perform some or all of the server-based processes described herein and may be any suitable network server and/or other type of processing device. For example, server 110 may be configured to provide consumer accounts (e.g., including associated payment accounts of consumers that may be used with point-of-sale system 108) on behalf of consumers, provide impressions or other advertising messages (e.g., including impressions) to consumer devices 108, determining targeted promotions for consumers, and/or facilitate the offer, purchase, and/or redemption (e.g., at the merchant shop) of promotions. In some embodiments, system 102 may function as a "cloud" with respect to the consumer device 106 and/or point-of-sale system 108. In that sense, server 110 may include several servers (e.g., one or more servers) performing interconnected and/or distributed functions. To avoid unnecessarily overcomplicating the disclosure, server 110 is shown and described herein as a single server.

In some embodiments, system 102 may be configured to receive promotion data indicating a promotion for goods and/or services and/or one or more parameters of the promotion (e.g., target audience, timing, purchase value, promotional value, residual value, underlying item, redemption time, redemption location, etc.). System 102 may then generate or determine one or more promotions as being relevant or targeted to the consumer and provide an impression including the one or more promotions to consumer device 102.

Database 112 may be any suitable network storage device. For example, database 112 may be configured to store promotion data (e.g., attributes of promotion, promotion parameters, etc., such as within an available promotion bank), consumer data (e.g., attributes of the consumer such as profile information, subpersona information, historical location and/or time data, preferences, purchase history, consumer behavior, payment accounts, among other things), and/or purchase transaction data (e.g., payment account information, credit card information, payment information, billing address, payment account information, among other things). As such, database 112 may include, for example, one or more database systems, backend data servers, network databases, cloud storage devices, etc. To avoid unnecessarily overcomplicating the disclosure, database 112 is shown and described herein as a single database.

Network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (such as, e.g., network routers, switches, hubs, etc.). For example, network 104 may include a cellular telephone, mobile broadband, long term evolution (LTE), GSM/EDGE, UMTS/HSPA, IEEE 802.11, IEEE 802.16, IEEE 802.20, WiFi, dial-up, and/or WiMax network. Furthermore, network 104 may include a public network, such as the Internet, a private network, such as an intranet, or combinations thereof, and may utilize a variety of networking protocols now available or later developed including, but not limited to TCP/IP based networking protocols.

Consumer device 106 may be associated with a consumer, such as a consumer with a consumer account provided by system 102. Although a single consumer device 106 is shown, system 100 may include any number of consumer devices that may be associated with various other consumers. Consumer device 106 may be a mobile device and/or a stationary device (e.g., home computer). For example, in some embodiments, consumer device 106 may be a mobile device such as a cellular telephone (including smartphones and/or other types of mobile telephones), laptop, tablet, electronic reader, e-book device, media device, wearable device (e.g., wristband, glasses, etc.) and/or the like capable of sharing its location with central system 102.

Connection 118, when used or available, may include a direct wireless connection between one or more communication beacons 116 (and/or merchant devices 114) and consumer device 106. In some embodiments, based on consumer presence data received from a communication beacon 116 indicating that consumer device 106 was detected to be within a wireless direct communicable range of communication beacon 116, server 110 may be configured to communicate with merchant device 114 and consumer device 106 via network 104 to provide the various functionalities discussed herein. For example, merchant device 114 and/or communication beacon 116 may be configured to broadcast a beacon identifier via a wireless personal area network (PAN) centered around merchant device 114 and/or communication beacon 116 that is different from network 104.

In some embodiments, communication beacon 116 may be configured to utilize a Bluetooth standard for the wireless communication such that Bluetooth-enabled consumer devices 106 may wirelessly connect with communication beacon 116 upon coming within communicable range of communication beacon 116. The communicable range of communication beacon may be configured to be of a range that is suitable for low power (e.g., less than 2.5 mW), high resolution distance determination within a merchant shop and/or a portion of the merchant shop. For example, the communicable range of the communication beacon using a Bluetooth standard can be within 1-10 meters, or any other suitable short range (e.g., 2, 3, 4 . . . 10, 11, etc. meters). In some embodiments, the communicable range may be configured based on the dimensions, layout, and/or other needs of a merchant shop. In some embodiments, consumer device 106 may be configured to communicate with point-of-sale system 108 via connection 118 and point-of-sale system 108, such as when consumer device 106 is within a communicable range of the wireless PAN and/or has no access to network 104.

FIG. 2 shows a schematic block diagram of example circuitry 200, some or all of which may be included in point-of-sale system 108, merchant device 114, communication beacon 116, system 102, server 110, database 112, and/or consumer device 106. In accordance with some example embodiments, circuitry 200 may include various means, such as one or more processors 202, memories 204, communications modules 206, and/or input/output modules 208.

As referred to herein, "module" includes hardware, software and/or firmware configured to perform one or more particular functions. In this regard, the means of circuitry 200 as described herein may be embodied as, for example, circuitry, hardware elements (e.g., a suitably programmed processor, combinational logic circuit, integrated circuit, and/or the like), a computer program product comprising computer-readable program instructions stored on a non-transitory computer-readable medium (e.g., memory 204) that is executable by a suitably configured processing device (e.g., processor 202), or some combination thereof.

Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments, processor 202 may comprise a plurality of processing means. The plurality of processing means may be embodied on a single computing device or may be distributed across a plurality of computing devices collectively configured to function as circuitry 200. The plurality of processing means may be in operative communication with each other and may be collectively configured to perform one or more functionalities of circuitry 200 as described herein. In an example embodiment, processor 202 may be configured to execute instructions stored in memory 204 or otherwise accessible to processor 202. These instructions, when executed by processor 202, may cause circuitry 200 to perform one or more of the functionalities described herein.

Whether configured by hardware, firmware/software methods, or by a combination thereof, processor 202 may comprise an entity capable of performing operations according to embodiments of the present invention while configured accordingly. Thus, for example, when processor 202 is embodied as an ASIC, FPGA or the like, processor 202 may comprise specifically configured hardware for conducting one or more operations described herein. As another example, when processor 202 may be embodied as an executor of instructions, such as may be stored in memory 204, the instructions may specifically configure processor 202 to perform one or more algorithms, methods or operations described herein. For example, processor 202 may be configured to execute operating system applications, firmware applications, media playback applications, media editing applications, among other things.

Memory 204 may comprise, for example, volatile memory, non-volatile memory, or some combination thereof. Although illustrated in FIG. 2 as a single memory, memory 204 may comprise a plurality of memory components. The plurality of memory components may be embodied on a single computing component or distributed across a plurality of computing components. In various embodiments, memory 204 may comprise, for example, a hard disk, random access memory, cache memory, flash memory, a compact disc read only memory (CD-ROM), solid state memory, digital versatile disc read only memory (DVD-ROM), an optical disc, circuitry configured to store information, integrated circuitry, chemical/biological memory, paper, or some combination thereof. Memory 204 may be configured to store information, data, applications, instructions, or the like for enabling circuitry 200 to carry out various functions in accordance with example embodiments discussed herein. For example, in at least some embodiments, memory 204 may be configured to buffer input data for processing by processor 202. Additionally or alternatively, in at least some embodiments, memory 204 may be configured to store program instructions for execution by processor 202 and/or data for processing by processor 202. Memory 204 may store information in the form of static and/or dynamic information. This stored information may be stored and/or used by circuitry 200 during the course of performing its functionalities.

Communications module 206 may be embodied as any component or means embodied in circuitry, hardware, a computer program product comprising computer readable program instructions stored on a computer readable medium (e.g., memory 204) and executed by a processing device (e.g., processor 202), or a combination thereof that is configured to receive and/or transmit data from/to another device, such as, for example, a second circuitry 200 and/or the like. In some embodiments, communications module 206 (like other components discussed herein) can be at least partially embodied as or otherwise controlled by processor 202. In this regard, communications module 206 may be in communication with processor 202, such as via a bus. Communications module 206 may include, for example, an antenna, a transmitter, a receiver, a transceiver, network interface card and/or supporting hardware and/or firmware/software for enabling communications. Communications module 206 may be configured to receive and/or transmit any data that may be stored by memory 204 using any protocol that may be used for communications. Communications module 206 may additionally and/or alternatively be in communication with the memory 204, input/output module 208 and/or any other component of circuitry 200, such as via a bus. Communications module 206 may be configured to use one or more communications protocols such as, for example, Bluetooth, Wi-Fi (e.g., a 802.11 protocol, etc.), radio frequency systems (e.g., 900 MHz, 1.4 GHz, and 5.6 GHz communication systems), infrared, mobile broadband, GSM, GSM plus EDGE, CDMA, quadband, and other cellular protocols, VOIP, and/or any other suitable protocol. In some embodiments, such as when circuitry 200 is embodied as a communication beacon, a root beacon, and/or a consumer device communication beacon, communications module 206 may be configured to generate a wireless PAN for communication with other devices within communicable range of the wireless PAN.

Input/output module 208 may be in communication with processor 202 to receive an indication of an input and/or to provide an audible, visual, mechanical, or other output. In that sense, input/output module 208 may include means for performing analog-to-digital and/or digital-to-analog data conversions. Input/output module 208 may include support, for example, for a display, touchscreen, keyboard, button, click wheel, mouse, joystick, an image capturing device, microphone, speaker, biometric scanner, and/or other input/output mechanisms. In embodiments where circuitry 200 may be implemented as a server or database, aspects of input/output module 208 may be reduced as compared to embodiments where circuitry 200 may be implemented as an end-user machine or other type of device designed for complex user interactions. In some embodiments (like other components discussed herein), input/output module 208 may even be eliminated from circuitry 200. Alternatively, such as in embodiments wherein circuitry 200 is embodied as a server or database, at least some aspects of input/output module 208 may be embodied on an apparatus used by a user that is in communication with circuitry 200. Input/output module 208 may be in communication with memory 204, communications module 206, and/or any other component(s), such as via a bus. Although more than one input/output module and/or other component can be included in circuitry 200, only one is shown in FIG. 2 to avoid overcomplicating the disclosure (e.g., like the other components discussed herein).

In some embodiments, non-transitory computer readable storage media can be configured to store firmware, one or more application programs, and/or other software, which include instructions and other computer-readable program code portions that can be executed to control processors of the components of system 200 to implement various operations, including the examples shown above. As such, a series of computer-readable program code portions may be embodied in one or more computer program products and can be used, with a device, server, database, and/or other programmable apparatus, to produce the machine-implemented processes discussed herein.

Any such computer program instructions and/or other type of code may be loaded onto a computer, processor or other programmable apparatus's circuitry to produce a machine, such that the computer, processor other programmable circuitry that executes the code may be the means for implementing various functions, including those described herein. In some embodiments, one or more external systems (such as a remote cloud computing and/or data storage system) may also be leveraged to provide at least some of the functionality discussed herein.

As described above and as will be appreciated based on this disclosure, various embodiments may be implemented as methods, mediums, devices, servers, databases, systems, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD/DVD-ROMs, flash memory, optical storage devices, quantum storage devices, chemical storage devices, biological storage devices, magnetic storage devices, etc.

Embodiments have been described above with reference to block diagrams of components, such as functional modules, system components and circuitry. Below is a discussion of an example process flowcharts describing functionality that may be implemented by one or more components discussed above. Each block of the block diagrams and process flowcharts, and combinations of blocks diagrams and process flowcharts, respectively, can be implemented by various means including computer program instructions. These computer program instructions may be loaded onto a general purpose computer, special purpose computer, or other programmable data processing apparatus, such as processor 202, to produce a machine, such that the computer program product includes the instructions which execute on the computer or other programmable data processing apparatus to create a means for implementing the functions specified in the flowchart block or block diagrams.

These computer program instructions may also be stored in a non-transitory computer-readable storage device (e.g., memory 204) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the block diagrams and process flowcharts, and combinations of blocks in the block diagrams and process flowcharts, can be implemented by special purpose hardware-based computer systems that perform the specified functions or steps, or combinations of special purpose hardware and computer instructions Providing Impressions FIG. 3 shows an example of a method 300 of providing an impression in accordance with some embodiments. Method 300 may be performed to determine the relevance of promotions in real-time, taking into account not only the characteristics of the user or consumer (e.g., based on information/data obtained from the consumer's mobile device and/or information/data obtained from a consumer profile stored to a remote server) but also based on an analysis of environmental factors such as local events, locations, and time. Method 300, as well as the other methods discussed herein, is described as being performed by system 100 (e.g., one or more servers 110). However, other suitable devices, apparatuses, machines, etc., may be used. For example, in some embodiments, some or all of the steps of the methods discussed herein as being performed by a server may be performed by a merchant device and/or a consumer device.

Method 300 may begin at 302 and proceed to 304, where a server may be configured to associate a consumer and/or consumer account with a consumer device. The consumer account may be provided and/or maintained by system 102 and may be used to associate the various consumer data discussed herein. In some embodiments, the server may be configured to provide a consumer interface to the consumer device. The consumer interface may be provided by any suitable technique, such as an application installed on the consumer device, a browser-based application, a text or email message, a text or email message containing a reference or link to an application, a social network message or feed item, among other things.

In some embodiments, the consumer interface may include a login interface. The consumer device may be configured to generate login data (e.g., username, password, etc.), such as via consumer input to an input device, and provide the login data to the server. Based on the login data, the server may be configured to identify the associated consumer account and authenticate the user. The server may be further configured to associate with consumer device with the consumer account based on receiving the login data associated with the consumer account from the consumer device.

At 306-324, the server may be configured to provide an impression including the one or more promotions to the consumer device. The impression may be provided at any suitable time and using any suitable communication channel. For example, in some embodiments, the consumer interface may be configured to provide a home display or other interface that includes the impression, such as subsequent to authenticating the user via the login interface. In another example, the impression may be provided as a search result, such as in response to receiving one or more search terms from the consumer device and with the promotions being selected based on the techniques discussed herein. In another example, the impression may be provided on a scheduled basis, such as daily, weekly, at a particular time of a day, etc. For example, the server may be configured to push the impression to the consumer device via one or more of email, short messaging service (SMS) text, application alert, social network feed item, among other things. In yet another example, the impression may be provided based on an occurrence of a triggering event or received signals from the consumer device, a merchant device, communication beacon, and/or third party system.

In some embodiments, server may be configured to determine that the consumer is at or nearby a particular merchant and provide a promotional offer associated with the merchant to the consumer device. Additionally or alternatively, the server may be configured to provide the impression in response or accordance to promotion data received from a merchant device. Example techniques for determining consumer device location and providing impressions are discussed in U.S. patent Ser. No. 13/801,610, titled "Consumer Presence Based Deal Offers," filed Mar. 13, 2013, and U.S. patent application Ser. No. 14/248,676, titled "Communication Beacon Based Promotions for Mobile Devices," filed Apr. 9, 2014, each of which is hereby incorporated by reference herein in its entirety.

At 306, the server may be configured to access promotion data defining promotions. For example, the server may access the promotion data in response to determining to provide the impression to the consumer. In some embodiments, the promotion data may be stored within system 102, such as in one or more databases 112, thereby providing a "promotion bank" including available promotions. The available promotions may be associated with different merchants, offering a variety of products, services, and/or experiences.

In some embodiments, each promotion may include one or more promotion parameters that define the characteristics of the promotion. As discussed in greater detail below, the characteristics or promotion parameters of the promotions may be used to determine multi-dimension scores. The promotions may then be rated and/or ranked for the consumer based on the multi-dimension scores. Some example promotion parameters, as discussed above, include the accepted value (e.g., a cost to purchase the promotion), the promotional value (e.g., the value of the resultant instrument beyond the accepted value), the associated item or items of the promotion, a redemption time, and/or a redemption location.

Promotion parameters defining the item of the promotion may define the product, experience, or experience underlying the promotion, or the characteristics of the item such as their quality, features, ratings, reviews, category or other taxonomy data, among other things. Promotion parameters may further define the characteristics or terms of the promotion. A redemption time parameter may define a possible and/or a recommended time at which the promotion may be redeemed at a merchant shop. For example, where a promotion is redeemed at a merchant shop, the redemption time may comprise the business hours of the merchant shop. In another example, where a promotion includes an expiration date or time, the redemption time may include times prior to the expiration date or time. In yet another example, the redemption time may represent a recommended or targeted redemption time at which the promotion may be redeemed. A redemption location parameter may indicate a location where the promotion may be redeemed, such as by providing an instrument to the merchant or otherwise. A promotion may include one or more redemption locations where the promotion can be redeemed for the underlying item, such where the promotion is offered by a merchant with multiple merchant shop locations. In other examples, a promotion count may indicate the number of instances of the promotion that are available to consumers, an environmental parameter may indicate the types of weather and/or other environmental conditions most suitable for redemption of the promotion. Additional examples of promotion parameters are further discussed below.

At 308, the server may be configured to determine a time dimension value associated with the consumer. The time dimension may define potential targeted redemption times or time-frames of interest. For example, the time dimension may include time dimension values that range from the current time to a future time (or to an unspecified or undefined time). An example time dimension may include discrete time dimension values such as current time, tonight, this week, next weekend, the next month, two months from now, etc. In another example, the time dimension may include continuous values ranging from the current time to a future time and/or unspecified time (e.g., no filtering or targeting based on redemption time). In some embodiments, the time dimension value, as well as one or more other dimension values discussed herein, may be specified by the consumer via the consumer device, such as through consumer input to the consumer interface.

In some embodiments, the server may be configured to determine the time dimension value as a current time. The current time may be defined as a current local time of the consumer, which may be determined based on a request from the consumer device or based on the location of the consumer device and the current server time. As such, promotions having associated redemption times that correspond with being currently redeemable at or otherwise relevant to the current time may be selected and/or given priority for consumer presentation. The server may then be configured, subsequent to determining the time dimension value as the current time, to provide an impression indicating a selected promotion to the consumer device in real-time and while the redemption time for the promotion has not lapsed. For example, the server may send the consumer device an impression indicating a promotion associated with a dine-in restaurant at or prior to the consumer's expected dinner time.

In some embodiments, the server may be configured to determine the time dimension value as a future time, or a future period of time, as discussed above. As such, promotions having associated redemption times that correspond with being redeemable at or otherwise relevant to the determined future time (e.g., later tonight, this week, etc.) may be selected and/or given priority for consumer presentation. For example, the server may be configured to determine consumer schedule data (e.g., indicating times and/or locations of planned trips or activities, birthdays, birthdays of friends or family, weddings, anniversaries, etc.), calendar data (e.g., indicating holidays), event data (e.g., indicating times and/or locations of events, concerts, sporting events, movie show times, parades, gatherings, etc.) to determine a suitable time dimension value. For example, in response to determining based on consumer schedule data indicating that the consumer is scheduled to attend a wedding in a week, the server may be configured to select or prioritize corresponding promotions having relevance to weddings. Some non-limiting examples may include promotions for a discount on formal attire at clothing merchants or promotions for discount airfare from the consumer's location to the location of the scheduled event. In some embodiments, the time dimension value may be specified by the consumer via the consumer device.

At 310, the server may be configured to determine a location dimension value associated with the consumer. The location dimension value may define potential targeted redemption locations of interest. In some embodiments, the server may be configured to determine a reference location (e.g., a current location or future location) of the consumer and the location dimension value may be defined relative to the reference location. For example, the location dimension may include location dimension values that range from a minimum distance from the reference (e.g., current) location of the consumer device (e.g., within half a mile) to a maximum distance (e.g., within 100 miles) from the reference location. Similar to the time dimension, the location dimension may also include discrete or continuous location dimension values. Exemplary discrete location dimension values may include redemption locations within walking distance, within the neighborhood or district, within the city, within the state, and within the country of the reference location. In some embodiments, the location dimension value and/or the reference location (e.g., current location or a future location) may be specified by the consumer via the consumer device.

When the reference location is the current location of the consumer, the server may be configured to determine the current location of the consumer device (as a proxy for consume location) using any suitable technique, including one or more of cell tower triangulation, internet protocol (IP) address geolocation, global positioning systems (GPS), consumer input, and/or consumer device presence proximity detection via a communication beacon or merchant device at a merchant shop location. For example, the server may be configured to receive consumer device presence data from the communication beacon or merchant device.

In some embodiments, the server may be configured to determine the location dimension value with respect to a scheduled, expected, or otherwise determined future location of the consumer and/or consumer device. For example, the server may be configured to receive consumer schedule data, calendar data, and/or event received from the consumer device, a third party system, and/or at system 102 that indicates a future location of the consumer. In another example, the server may be configured to determine location data of the consumer device at various times to generate a time-based location profile (e.g., and/or persona) of the consumer. For example, the server may poll the consumer device or otherwise determine current locations at various times to determine the location of the consumer's home, workplace, commute path, regular shopping areas, etc. The expected and/or future location of the consumer may then be used to provide or prioritize promotions having a redemption location that corresponds with or within a particular distance (e.g., as defined by the location dimension value) of the expected and/or future location.

At 312, the server may be configured to determine an environmental dimension value. The environmental dimension value may define potential targeted environmental factors and/or parameters of interest. For example, in some embodiments, the environmental dimension value may include indoor and outdoor environmental dimension values, or a range of environmental dimension values ranging from indoor, to neutral, to outdoor environmental dimension values. Where the environmental dimension value is determined to be indoor, promotions associated with indoor products, services, or experiences may be selected or given priority to outdoor products, services, or activities.

In some embodiments, the server may be configured to determine the environmental dimension value based on a reference weather condition, which may be a real-time and/or forecasted weather. For example, based on a reference location and time, the server may be configured to access weather data to determine the real-time weather of the consumer. The server may be further configured to determine the environmental dimension value based on the real-time weather. The outdoor environmental dimension value may be determined based on the reference weather condition including comfortable temperatures (e.g., between 60 to 90 degrees Fahrenheit) and sunshine. In another example, the indoor environmental dimension value may be determined based on the reference weather condition including uncomfortable temperatures, precipitation, etc.

In some embodiments, the server may be configured to receive weather data from the consumer device to determine the environmental dimension value. For example, the consumer device may include a thermometer, barometer, hygrometer, among other things. The circuitry of the consumer device may be configured to determine the weather data based on receiving measured values from the instrument, and may be further configured to provide the weather data to the server. Additionally or alternatively, the server may receive weather data from a third party system, such as historical or forecasted whether data, and may use such data to determine the environmental dimension value.

At 314, the server may be configured to determine a price dimension value. The price dimension value may define a price or price range for the accepted value (e.g., a cost to purchase the promotion) of a promotion. For example, the price dimension may include price dimension values associated with different tiers or ranges of pricing, such as under $10 (e.g., low), from $10 to $20 (e.g., medium), from $20 to $50, over $50 (e.g., high), etc. In some embodiments, where consumer device may generate or send price data indicating the preferred price dimension value. In some embodiments, the server may be configured to programmatically determine the price dimension value. For example, the server may determine the price dimension value based on tracked consumer data and/or persona data indicating historical spending habits and patterns of the consumer. Using the techniques discussed herein, the server is capable of determining the price dimension value that is most suitable to the consumer based on the event or activity of the consumer and/or the role of the consumer within the activity. For example, the consumer may be more interested in fine-dining restaurants during business days, work times, or work locations but prefer more family dining restaurants on weekends, while near the home, etc.

At 316, the server may be configured to determine a consumer preference dimension value. The consumer preference dimension may define potential targeted consumer preferences or interests. For example, the server may be configured to generate a consumer profile based on tracking the activities of the consumer based, such as purchase history, preferences, browsing history, profile data, social networking data, etc. The server may be further configured to determine the consumer preference dimension value based on the consumer profile. For example, based on receiving item purchase data from a merchant device, the consumer device, and/or a third party system, the server may determine that the consumer has a preference for pizza, and thus may determine the consumer preference dimension value as defining a preference for pizza or related items. In some embodiments and as discussed in greater detail below with respect to method 400 and FIG. 4, the consumer preference dimension values may define different "personas" of a consumer, each of which may be associated with relevant interests, preferences, times, locations, among other things.

At 318, the server may be configured to determine a dimension score associated with each of the dimension values for a promotion. The dimension score associated with a dimension value for a promotion may indicate the amount that the promotion matches, satisfies, and/or otherwise corresponds with the determined dimension value. As such, the server may be configured to determine for each promotion under consideration (e.g., stored within the promotion bank of database 112), a time dimension value score associated with the time dimension value, a location dimension value score associated with the location dimension value, an environmental dimension value score associated with the environmental dimension value, a consumer preference dimension value score associated with the consumer preference dimension value, and/or a price dimension value score associated with the price dimension value.

The time dimension value score may indicate whether and/or the amount that the redemption time of a promotion matches or satisfies the time dimension value determined at 308. The server may be configured to determine the time dimension value based on comparing the redemption time associated with the promotion with the determined time dimension value. For example, if the time dimension value is determined to be the current time, promotions having redemption times that correspond with the current time, or are at or nearer in time to the current time, may be determined as a higher time dimension value score than promotions having redemption times that fail to correspond and/or are further from the current time. As discussed above, the redemption time of the promotion may represent a recommended or targeted redemption time at which the promotion may be redeemed, the business hours of a merchant shop redemption location, an expiration date or time, etc.

The location dimension value score may indicate whether and/or the amount that a redemption location of the promotion matches or satisfies the location dimension value determined at 310. The server may be configured to determine the location dimension value based on comparing the redemption location associated with the promotion with the determined location dimension. For example, if the location dimension value is determined to be within half a mile from the current location, promotions having redemption locations that correspond with the location dimension value, or are at or nearer to the current location, may be determined as a higher location dimension value score than promotions having redemption locations that fail to correspond with and/or are further from the current location. In some embodiments, the location dimension value score may be determined based on the distance of the redemption location to the reference location.

The environmental dimension value score may indicate whether and/or the amount that an item associated with the promotion matches or satisfies the environmental dimension value determined at 312. The server may be configured to determine the environmental dimension value based on comparing an environmental parameter of an item associated with the promotion with the determined environmental dimension. For example, if the environmental dimension value is determined to be an outdoor dimension value, promotions having products, experiences or serves that can be enjoyed outdoors (e.g., outdoor dining, outdoor concerts or sporting events, camping, cold drinks, etc.) may be determined as a higher environmental dimension value score than promotions having items that are more suitable for indoors (e.g., dine-in restaurants, retail shopping, etc.). In some embodiments, the environmental dimension value score may be determined based on suitability of the item to the reference weather condition. In some embodiments, the server may be configured to determine an environmental parameter of a promotion or item based on characteristics, category, or themes associated with the item.

The price dimension value score may indicate whether and/or the amount the accepted value of the promotion matches or satisfies the price dimension value determined at 314. The server may be configured to determine the price dimension value based on comparing promotion data that defines the accepted value of the promotion with the price dimension value. For example, if the price dimension value is determined to be a low tier or value (e.g., under $10), promotions having accepted values that correspond with (e.g., fails to exceed the upper limit of the tier), or are closer to the tier of the determined price dimension value, may be determined as a price dimension value score than promotions having accepted values that are further from and exceed the price dimension value.

The consumer preference dimension value score may indicate whether and/or the amount that the underlying item of the promotion matches or satisfies the consumer preference dimension value (e.g., and/or persona), determined at 316. The server may be configured to determine the consumer preference dimension value based on comparing promotion data that defines or characterizes the promotion with the consumer preference dimension value. For example, if the consumer preference dimension value is determined to indicate an interest in action movies, promotions associated with items that that correspond with (e.g., other action movies) or more closely match (e.g., the For example, if the consumer preference dimension value is determined to be the at-work persona, promotions associated with items that that correspond with or more closely match the at-work persona may be determined as a higher consumer preference dimension value score than promotions associated with items that fail to correspond with and/or are less relevant to the at-work persona.

Similarly, the server may be configured to determine other promotion selection dimensions, and to determine dimension value scores associated with the other dimensions (e.g., service quality, rating, reviews, etc.). In some embodiments, the dimension scores include values that range based on a common scale (e.g., 0 to 100, with 0 being the lowest and 100 being the highest dimension scores).

As discussed above, in various embodiments, some or all of the dimension values discussed herein may be used. For example, where a single dimension value is used, such as the location dimension value, the server may be configured to determine only the location dimension value score associated with the single dimension value. In that sense, one or more of steps 308-316 may be optional in various embodiments.

At 320, the server may be configured to determine a multi-dimension score for the promotion based on dimension scores associated with the dimension values. In some embodiments, the server may determine a multi-dimension score for a plurality of available promotions under consideration stored in the promotion bank.

In some embodiments, the multi-dimension score may be determined based on an algorithmic transformation of each of the dimension value scores. For example, each dimension value score under consideration may be adjusted by a weighting value, and then summed and/or averaged to determine the multi-dimension score as a weighted average of dimension value scores. The dimension value scores may be scaled from 0 to 100 and the weighting values may range from 0 to 1. The 0 weighting value for a dimension may indicate that the dimension is not being considered for the multi-dimension score and the 1 weighting value may indicate the dimension is being given the highest weight. The server may be configured to apply the weighted dimension value scores to determine the multi-dimension score, such as by summing each weighted dimension value and/or taking an average of each weighted dimension value.

In some embodiments, the server may be configured to use a machine learning process to determine the suitable weighting values that are most suitable. For example, based on tracking consumer responses to impressions such as promotion purchases, searches, clicks or browses, page scrolls, redemptions, etc. the server may determine suitable weighting values that maximize one or more of such parameters of the consumer response to the promotion.

In some embodiments, the weighting values of the dimension scores may alternatively or additionally be selected by the consumer. For example, the server may be configured to provide a consumer interface to the consumer device that allows the consumer to add, remove (e.g., weighting value=0), and/or prioritize the dimensions (e.g., based on weighting values ranging from 0 to 1). The server may be further configured to apply a weighting value to each dimension score based on the consumer input. In some embodiments, such as where only a single dimension value is being used, the server may determine the multi-dimension score of the promotion as and/or based on the dimension value score of the dimension value.

At 322, the server may be configured to rank the promotions based on multi-dimension scores. For example, the server may be configured to compare the multi-dimension scores for each promotion under consideration and may rank the promotions based on the values of the multi-dimension scores.

As discussed above, promotions may be rated and/or ranked by multi-dimension scores having flexible dimensions that can be tailored to various applications or use cases. For example, based on determining the current location and time of the consumer device, the server may be configured to provide a multi-dimension impression of a promotion that has a redemption location nearby the consumer in time and space, can be purchased and redeemed on-demand, within the consumer's price range, and is relevant to the an interest, preference, activity or persona of the consumer. In that sense, the system is capable of providing hyperlocal promotional offers to consumers that are responsive, in real-time, to the day-to-day activities of the consumer. For example, the consumer interface of the consumer device may include a Now button, or the like, that is configured to send a request for an impression including promotions that are relevant to the current location and/or time of the consumer device. In another example, the consumer interface may allow the consumer to request a promotion bundle and provide any promotion bundle limits, as discussed in greater detail below in method 500 and FIG. 5.

In some embodiments, dimension values may interrelate and influence each other for the consumer. For example, the server may be configured to determine an applicable persona and/or price dimension value based on the time dimension value and the location dimension value. In another example, based on the time dimension value and calendar data of the consumer, the server may be configured to determine an applicable location dimension value reference location. In some embodiments, where a first dimension value is used as a basis for determining a second dimension value, the server may forego determining the dimension value score for the first dimension value in determining the multi-dimension score to overweighting the first dimension.

At 324, the server may be configured to generate an impression including one or more promotions based on the ranking. The server may be configured to select one or more promotions for presentation to the consumer based on the ranking of the promotions. For example, the server may select the top ranking promotion based on multi-dimension scores, or a plurality of the highest ranking promotions. The impression may include an indication of the one or more promotions. In some embodiments, the impression may be provided as part of a consumer interface that allows the consumer to view, search, browse, purchase, and/or redeem promotions.

In some embodiments, one or more of the promotions of the impression may be selected based on other than multi-dimension score. For example, promotions may be selected based on tracking previously sent promotions such that system 102 is capable of providing fresh promotions to consumers. The server may be further configured to determine a diversity score of the promotion indicating the similarity of the promotion (e.g., along one or more dimension values) with other promotions that have been previously provided via impressions to the consumer. As such, the consumer may receive promotions for items that surprise and delight the consumer, such as items towards which the consumer may have expressed no prior interest or preference.

At 326, the server may be configured to provide the impression to a consumer device. For example, the server may provide the impression to the consumer device via network 104, such as via the Internet. In another example, the server may provide the impression via point-of-sale system 108. For example, merchant device 114 and/or communication beacon 116 may be configured to receive the impression, and may provide the impression to the consumer device via connection 118.

The impression may be provided as part of the consumer interface to the consumer device, such via an application installed on the consumer, a browser-based application, a text or email message, a text or email message containing a reference or link to an application, a social network message or feed item, among other things. In some embodiments, the impression may be provided as an advertisement within a webpage. For example, the server may be configured to provide an application programming interface that allows the provider of the webpage to request impressions for the webpage, which may be generated and/or provided in real-time to the consumer device via the webpage. Method 300 may then proceed to 328 and end.

Consumer Personas

FIG. 4 shows an example of a method 400 of generating personas of a consumer in accordance with some embodiments. Rather than treating the consumer as only a single static entity or "profile," the server may be configured to associate the consumer and/or consumer account with a plurality of different personas. As such, the techniques discussed herein may allow the capability of recognizing that consumers may take on different activities and roles at various times or places, and providing different items or promotions the consumer at different times based on such different roles and activities. For example, the server may be configured to receive, infer (e.g., based on tracking the user's location and activities over time), and/or otherwise determine the roles, events or activities in which the consumer participates. The server may be further configured to determine the characteristics of each role such as the consumer's preferences, purchases (e.g., which can be monitored with precision, such as to the individual item level), or activities under a role, the time periods in which a role is applicable, the locations at which the role is applicable, and/or the price range of consumer transactions within the role. As such, the techniques discussed herein may allow consumers to receive real-time impressions indicating promotions that are responsive to changing consumer preferences at particular times, locations, environmental conditions (e.g., local weather, events, etc.) and/or while performing various activities. Furthermore, the impressions may be provided to the consumer device based on with the current time and location of the consumer, among other things.

Method 400 may begin at 402, and proceed to 404, where the server may be configured to receive consumer information associated with a consumer from a consumer device. Based on receiving data, signals, and/or other transmissions from various sources (e.g., the consumer device, a merchant device, and/or third party system), the server may be configured to track the activity of the consumer, including the times and locations of activities, to determine the personas of the consumer. The various personas of the consumer may be used to determine promotions that are relevant to each persona, such as by using the personas as consumer preference dimension values in determining consumer preference dimension value scores as discussed above in method 200. However, personas can also be used in other relevance-based search or matching for promotions, items, etc.

The server may be configured to receive the consumer information from the consumer device, such as via network 104. The consumer information may include profile information, consumer account information, contact information, social networking information, preferences, interests, etc. Such information may be received by the server, processed, associated with the consumer account, and/or stored in system 102.

In some embodiments, the consumer device may be configured to transmit its location to the server. The consumer information received from the consumer device may include the location of the consumer device (e.g., used as a proxy for consumer location) and, in some embodiments, the time associated with the location. The server may receive location data indicating the location of the consumer device using any suitable technique, including one or more of cell tower triangulation, internet protocol (IP) address geolocation, global positioning systems (GPS), and/or consumer input via the consumer device, among other things. In some embodiments, the server may be configured to determine the current time of the consumer based on the location of the consumer device and the current server time. Additionally or alternatively, the time may be determined based on the time at which the consumer information is generated by the consumer or received by the server from the consumer device.

In some embodiments, the server may be configured to request and/or otherwise receive the location data at scheduled or predetermined times. For example, the location of the consumer device may be polled every hour, 15 minutes, 30 minutes, day, etc. to develop a time-based location profile. In another example, the consumer device may be configured to programmatically send its location to the server at predetermined times. As discussed above, the server may determine current locations at various times to determine the location of the consumer's throughout a day, a week, a month, etc. Based on the time-based location data, and using in some embodiments using other consumer information (e.g., profile information, contact information, etc.), the server may be configured to determine the relevant locations of the consumer. Some example relevant locations may include the home, workplace, commute path, regular shopping areas, etc. Furthermore, the server may also associate the locations with the times of the day, week, month, year, etc. in which the consumer is at the locations.

In some embodiments, the consumer device may comprise a wearable device, such as head mounted computing devices, augmented reality devices (e.g., including a camera, display, processing circuitry, eye-motion and/or position sensors, audio input, etc.), wristband devices, among other things. Where the consumer device is a head-mounted computing device and/or augmented reality device, the consumer device may be configured to generate consumer data indicating the items, objects, merchants, places, etc. that the consumer views (e.g., a fixed gaze for a predetermined amount of time), as well as the times and associated location of the views. Here, the consumer device and/or server may be configured to process image data captured by a camera or other sensor of the consumer device to determine the items, objects, merchants, signage, advertisements, and/or places of consumer interest. In another example, the consumer information may be generated based on a consumer input to a wearable device, such as a touchscreen input, voice command (e.g., requesting information about a viewed object), eye motion (e.g., a fixed gaze for a predetermined amount of time on an object), among other things.

At 406, the server may be configured to receive consumer information associated with the consumer from a merchant device and/or a communication beacon associated with a merchant. For example, the merchant device may be located at a merchant shop and configured to provide point-of-sale functionality (e.g., generation of bills or tabs, and facilitating consumer payment for items, inventory management, reservations, promotion redemptions, time keeping, accounting, among other things). The merchant device may be further configured to receive from the merchant device and/or generate consumer data indicating the items purchased by the consumer, the time and/or location of the purchase, among other things. In some embodiments, the server may be further configured to receive item data defining the characteristics or parameters of the purchased item from the promotion device.

In some embodiments, the merchant device and/or communication beacon may be further configured to provide consumer information based on consumer device presence detection. For example, the merchant device and/or communication beacon may be located at the merchant shop and be configured to provide presence data to the server indicating that the consumer device was detected to be within a wireless direct communicable range of merchant device and/or communication beacon. Furthermore, the presence data may further indicate and/or otherwise be associated with the time at which the consumer device presence was detected. As such, a consumer that is carrying the consumer device may be detected when the consumer walks into (and/or passes nearby) the merchant shop, and such information can be transmitted to system 102. Furthermore, as the consumer traverses throughout the day and passes several merchants, the consumers locations, associated times, and purchases if applicable may be tracked by system 102.

At 408, the server may be configured to receive consumer information associated with the consumer from one or more third party systems. The third party systems may include one or more online retail systems, point-of-sale systems, payment transaction systems (e.g., credit card systems, banking systems, etc.), social networking systems, customer relationship management (CRM) systems, and/or any other system that interacts with the consumer. The server may resolve heterogeneous taxonomies of consumer information from different third party systems to integrate the consumer information, resolve redundancies, and generate persona data. Example consumer information from third party systems may include item purchase data (e.g., price, time, and/or location), consumer preference data, social data (e.g., friends, group membership, parental status, etc.), browsing data, etc.

At 410, the server may be configured to generate a persona based on the consumer information. Some example personas of a consumer may include an at-work persona, an at-home persona, a parent persona, a spousal persona, a traveling persona, a work out persona, a move-goer persona, a restaurant-goer persona, a sports fan persona, a relationship status persona, etc. The server may generate persona data that defines the persona, including the associated times, locations, and consumer preferences of the persona. "Persona data," as used herein, refers to consumer information (e.g., received at one or more of 404-408) that has been formatted, transformed, and/or otherwise categorized by persona. The persona data may be stored in system 102, such as in database 112, and may be accessed by server 110 for determining a consumer preference dimension score for a promotion and the determined persona. Each persona may be associated with persona data indicating the applicable interests or preferences of the consumer under the persona. For example, the restaurant-goer persona may be associated with the restaurants the consumer has visited, the items and characteristics of the items purchased by the consumer, the locations and times of the visit, characteristics of the consumer such as food preferences, allergies, etc., price ranges, etc.

The server may be configured to generate the persona based on processing received consumer data and/or signals from various sources as discussed above. For example, the server may determine that the consumer is at home based on determining that the consumer device is at or near a particular location during the nighttime hours of the day, or based on consumer input, and using on such information, may determine that the consumer is at home at a particular time. The server may be further configured to associate received consumer information indicative of activity of the at-home hours and/or location as indicative of the consumer's interests for an at-home profile, such as a consumer's shopping behavior at a nearby grocery store, café or restaurant.

In another example, the server may determine time and location patterns that indicate the location and working hours of the consumer, and the relevant preferences or interests. Based on the items ordered, the merchant from which items were ordered, provided search terms, browsing history data, or other consumer information generated while the consumer is at work, the server may be configured to update the at-work profile to indicate consumer preference for a merchant or item. In another example, based on the merchant or items purchase history, promotion purchase history, provided search terms, browsing history data, etc., indicating consumer interest in childcare related items, the server may be configured to generate or update a parent persona.

In some embodiments, the server may be configured to determine whether the consumer information corresponds with an existing persona of the consumer. Where the consumer information corresponds with the existing persona, the existing persona may be updated to include the consumer information. On the other, where the consumer information fails to correspond with an existing persona, the server may be configured to generate the persona based on the consumer information.

In some embodiments, a persona may be directed to group, family, and/or social relationships. For example, a persona may be based on membership in a group or organization, and the consumer's role within the organization. A family or parent persona may indicate that the consumer is a member of a family and may be associated with more detailed information about children, a spouse, or other relative (e.g., age, birthday, gender, interests, etc.). In some embodiments, different users may each be associated with different consumer accounts and that may be further associated with each other via personas.

In some embodiments, the persona may further be associated with a time or time period when the consumer adopts the persona and/or a location or locations where the consumer adopts the persona. As such, the server may be configured to determine the consumer preference dimension value (e.g., as discussed at 316 of method 300) as a particular persona based on a current time and/or consumer location, or a future time and/or future consumer location. In some embodiments, the server may be configured to determine the person and/or consumer preference dimension value based on consumer input. For example, the consumer interface may provide for the creation and/or selection of a persona by the consumer, and may further allow the consumer to request an impression including promotions that are determined based on the selected persona. Furthermore, the server may be further configured to determine the consumer location and time at which the consumer selected the persona to associate the location and time with the persona (e.g., as being a time and location in which the persona is applicable to the consumer).

In some embodiments, the server may be configured to determine the persona based on one or more other dimension values (e.g., as discussed at 310-314 of method 300). For example, programmatically or in response to receiving a request and/or signal from the consumer device, the server may be configured retrieve stored persona data and the associated times, locations, environmental conditions, and/or price range of each persona. The server may be further configured to determine a persona based on matching the current time, location, environmental conditions with the associated times, locations, and/or environmental conditions of the stored personas. In another example, the server may be configured to determine the persona based on a click or promotion selection within an impression, receiving one or more search terms from the consumer device, and/or other indication of interest in or preference for a particular item, among other things. For example, based on the consumer providing an indication of interest in promotions for a spa, the server may be configured to determine the consumer preference dimension value or persona associated with a preference for spas (e.g., an at-home persona) to provide related or otherwise relevant promotions. In that sense, based on a determined persona, the server may be able to select different promotions to provide to the consumer device at given times (e.g., (e.g., during work times, during home times, during vacation times, etc.) and/or consumer device locations (e.g., when the consumer is at work, during a commute, nearby a particular merchant, etc.). Furthermore, one or more other factors may additionally be used (e.g., weighted or otherwise), such as the environment, price, etc. to determine multi-dimension scores for promotions as a basis for performing the selection. Method 400 may then proceed to 412 and end.

Providing Promotion Bundles

FIG. 5 shows an example of a method 500 of providing a promotion bundle in accordance with some embodiments. A promotion bundle, as used herein, refers to a set including one or more promotions, one or more items (e.g., non-promotional), and/or combinations thereof. For example, a promotion bundle may include promotions or items that are complementary to each other as a set. For example, a promotion bundle may include a promotion for dinner at a dine-in restaurant and promotion for a movie, each of which may be redeemable within the same evening and geographic area. In another example, a promotion bundle may include a promotion and a non-promotional item. For example, the dinner at the restaurant may be a promotion (e.g., including a discount) while the movie may be undiscounted.

Method 500 may begin at 502, and proceed to 504, where the server may be configured to determine available promotions for inclusion within a promotion bundle. In some embodiments, some or all of the promotions stored within the promotion bank may be given a syndication status. In some embodiments, system 102 may be configured to provide promotions on behalf of the merchant in exchange for payment per promotion purchase (e.g., pay-per-transaction). For example, the server may deduct a portion of the accepted value of the promotion (or "pay-per-transaction portion," as used herein) from the merchant's total income for the promotion purchase. The server may be configured to receive promotion data and/or merchant agreement data that define the accepted value and the pay-per-transaction portion of the accepted value, among other things, and may be configured to generate, modify, and/or update the promotion bank based on the received data.

In some embodiments, the promotion data may define a promotion count, indicating a number of instances of the promotion that the system is authorized to sell on behalf of the merchant. The promotion count may be decremented for each consumer purchase and/or acceptance of the promotion. The server may be configured to determine a promotion as an available promotion, for inclusion within an impression bundle or otherwise, based on the promotion count indicating that an instance of the promotion remains. In some embodiments, the promotion may not include a promotion count. For example, the merchant may specify that system 102 is authorized to sell as many instances as possible in accordance with the promotion data defining the characteristics of the promotion. In some embodiments, the promotion data may further define whether the merchant has authorized the system to provide the promotion within a bundle of other promotions, which the server may use to determine whether the promotion is available for inclusion within a promotion bundle.

At 506, the server may be configured to determine available items (e.g., products, experiences, or services) for inclusion within the promotion bundle. In some embodiments, the server may be configured to receive item data from merchant devices and/or third party systems to generate an item bank. The item data can take many different forms, including menu data, consumer purchase data, ratings, reviews, social networking feeds, comments, among other things. The server may be configured to integrate item data from various third party systems and to resolve heterogeneous taxonomies of data sets to create item profiles for each item. Furthermore, the discussion in method 300 above regarding multi-dimension scores of promotions may be applied to items to determine the relevant items.

The item bank may define items offered by merchants which are not associated with a promotion provided by system 102. The item data may further include characteristics of the item. The discussion herein regarding promotion data defining the items of promotions may be applicable to item data defining items. For example, item data may define the underlying item, the price of the item, the receivable time of the item (e.g., the recommended or possible times consumer can pick up or otherwise receive the item from the merchant), a receivable location of the item (e.g., the recommended and/or possible locations the consumer can pick up or otherwise receive the item), etc. In some embodiments, a promotion bundle may include only promotions or only items.

At 508, the server may be configured to determine a bundle limit value. The bundle limit value may define a constraint on the collective characteristics of the promotions and/or items of a bundle. For example, the bundle limit value may be defined based on the price dimension, the time dimension, the location dimension, the environmental dimension, the consumer preference dimension, among other things. As such, promotion bundles may be provided to consumers based on various levels of constraints such as cost, date, location, theme, etc. Furthermore, combinations of constraints may be used to provide promotion bundles relevant to particular events, activities, travel, consumer group membership or roles, group even planning, etc., to provide promotion bundles that are relevant to consumer.

For example, the server may determine the bundle limit value based on the price dimension. The bundle limit value may define a maximum price that the consumer is willing to pay for a bundle. Alternatively or additionally, the bundle limit value may be based on the time dimension and may define a maximum time away from a reference time (e.g., the current time or a future time) that is acceptable to the consumer for the redemption time of promotions and/or receivable time of items within the bundle. Alternatively or additionally, the bundle limit value may be based on the location dimension and may define a maximum distance away from a reference location (e.g., the current location) that is acceptable to the consumer for the redemption location of promotions and/or receivable location of items within the bundle. Alternatively or additionally, the bundle limit value may be based on the consumer preference dimension and may define a persona or theme (e.g., night out, vacation, wine sampling, etc.) for the items and promotions within the bundle.

In some embodiments, the server may be configured to determine the bundle limit value based on receiving an instruction or request from the consumer device. The consumer interface may be configured to allow the consumer to provide a consumer input that selects one or more dimensions and/or defines a bundle limit value for the one or more dimensions. As such, the system is able to provide promotion bundles, or impressions indicating promotions bundles, to the consumer that meet the bundle limit value. For example, the consumer may specify a bundle limit value for the price that caps the maximum accepted value of the promotion bundle that the consumer is willing to spend. The server may be further configured to determine and/or generate the promotion bundle that corresponds with or best matches the consumer request (e.g., based on multi-dimension scores).

At 408, the server may be configured to determine promotions and/or items of a promotion bundle. In some embodiments, the server may be configured to perform a set-aware optimization to generate promotion bundles that include the most optimized set of promotions and/or items for the consumer, without collectively exceeding or violating a bundle limit value. As such, the consumer may be request and/or otherwise receive impressions indicating promotion bundles that can be purchased that are optimized for the consumer while also meeting various levels of constraints (e.g., "make me happy" for under $100).

For example, the determination of promotions and/or items to include within a promotion bundle may be based on theme. The available promotions and/or items may be categorized by or associated with themes. In general, themes may be directed to activities, events, or preferences of consumers. The server may be configured to determine promotions and/or items of a promotion bundle based on determining a theme, and then selecting promotions and/or items from different categories that are associated with the theme.

For example, restaurants, flowers, and movie showings may be both associated with a date night theme. In another example, attractions, hotels, car rentals, etc. may be associated with a vacation or tourism theme. In some embodiments, each promotion and/or item may be associated with a category (and/or subcategories), with each category being associated with one or more themes. The associations between items/promotions, categories, and themes may be stored as item and/or promotion data within system 102 using any suitable technique. For example, each item may include meta-tags indicating the associated categories and/or categories. The associations between categories/subcategories and themes may also be stored in the database. In some embodiments, the associations between categories and themes may be determined based on tracking consumer information, such as purchase histories. For example, promotions and/or items that are purchased together while a consumer is operating under a particular persona may indicate an association of the promotions and/or items with a theme relevant to the persona The bundle limit value may be defined based on a dimension by which promotions or items may be deemed relevant to the consumer. Where the bundle limit value is based on the price dimension, or a price bundle limit value, the server may be configured to determine price promotion parameters and/or price item parameters of the available promotions and/or available items. The server may be further configured to generate promotion bundles including promotions and/or items that collectively fail to exceed or violate the price bundle limit. In that sense, the consumer is able to specify a price ceiling and receive optimized promotion bundles at or below the price ceiling.

In another example, where the bundle limit value is based on the time dimension, or a time bundle limit value, the server may be configured to determine redemption time promotion parameters and/or receivable time item parameters of the available promotions and/or available items. The server may be further configured to generate promotion bundles including promotions and/or items that collectively or each can be redeemed within the time bundle limit. In that sense, the consumer is able to specify a particular time and receive optimized promotion bundles that can be enjoyed at or within the specified time. Similarly, where the bundle limit value is a location bundle limit value, the server may generate bundles including promotions and/or items that collectively or each can be redeemed at locations within the location bundle limit value.

When the bundle limit value is based on the consumer preference dimension, or a consumer preference bundle limit value, the server may be configured to determine the categories and themes that are relevant to a consumer preference dimension value or persona. The server may be further configured to generate promotion bundles including promotions and/or items that match or most closely correspond with the theme associated with determined persona. To facilitate the matching, personas may further be with one or more themes within the consumer data. For example, a persona may be based on membership in a group or organization, and the consumer's role within the organization may be associated with themes that are relevant to the organization to facilitate group even planning.

In some embodiments, the server may be further configured to determine bundle parameters of the promotion bundle. For example, the bundle parameters may include a bundle purchase price and bundle discount parameter indicating a difference between the bundle and the accepted values of the promotions (and purchase price of the items, if applicable) within the promotion bundle. The bundle discount parameter may be set to a non-zero value to further incentivize consumer purchase of promotions and/or items as a bundle. In some embodiments, the bundle discount parameter may be 0 such that the promotion bundle does not include a further discount (e.g., beyond any discounts associated the promotions of the promotion bundle).

At 510, the server may be configured to determine a bundle dimension score for the promotion bundle. The bundle dimension score may represent an overall relevance or targeting score for the promotion bundle with respect to the consumer. The server may be further configured to generate a plurality of promotion bundles and determine bundle dimension scores for each of the plurality of promotion bundles as a basis for rating and/or ranking the promotion bundles.

In some embodiments, the bundle dimension score may be determined based on the multi-dimension scores associated with each promotion and/or item within the promotion bundle, such as by taking a sum, average, and/or other algorithmic transformation of the multi-dimension scores. In some embodiments, various promotions and/or items within the promotion bundle may receive different weighting values. For example, promotions with higher accepted values or items of higher price may be given a higher weighting value such that their multi-dimension scores have a larger impact on the bundle dimension score. The discussion above in method 300 regarding determining a multi-dimension score may be applicable at 510.

At 512, the server may be configured to rank promotion bundles based on bundle dimension score. Promotion bundles with higher bundle dimension scores may be determined to be more relevant to the consumer than promotions with lower bundle dimension scores.

At 514, the server may be configured to generate an impression including one or more promotion bundles based on the ranking of the promotion bundles. The discussion at 324 of method 300 may be applicable at 514. At 516, the server may be configured to provide the impression to a consumer device. The discussion at 326 of method 300 may be applicable at 516. In some embodiments, the impression may be provided as an advertisement within a webpage of a third party system. Advantageously, the server may be able to provide promotions associated with different merchants having syndication status to third party webpages on a pay-per-transaction basis for each merchant. Here, merchants may be more inclined to allow the system to provide impressions of promotions and promotion bundles than under a pay-per-click transaction model or the like. Method 500 may then proceed to 518 and end.

Various embodiments, applicable in some embodiments, are described below in Exhibit A.

Conclusion

Many modifications and other embodiments will come to mind to one skilled in the art to which these embodiments pertain having the benefit of the teachings presented in the foregoing descriptions and the associated drawings. For example, some or all of the steps in the method flows above being described as being performed by a server may be performed by a consumer device, merchant device, and/or communication beacon. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus, comprising:
   circuitry configured to:
      determine available promotions for inclusion within a promotion bundle;
      determine, based on the available promotions, one or more promotions of the promotion bundle;
      determine a bundle limit value defining a constraint on a dimension value of each of the one or more promotions;
      determine one or more promotions of the promotion bundle, wherein the dimension value of each of the one or more promotions collectively fail to exceed the bundle limit value;
      track, using a machine learning process, consumer responses to one or more impressions previously provided to at least one consumer;
      for each particular promotion of the one or more promotions of the promotion bundle:
         determine one or more dimension scores of the particular promotion, the one or more dimension scores corresponding to each dimension value of a set of dimension values associated with the particular promotion;
         determine, using the machine learning process, a weighting value for each of the one or more dimension scores that maximizes a parameter of a consumer response to the particular promotion;
         generate a multi-dimension score for the particular promotion based on at least the weighting values and the one or more dimension scores for the particular promotion; and
      determine a bundle dimension score for the promotion bundle based on the multi-dimension score for each of the one or more promotions of the promotion bundle; and
      determine a ranking of promotion bundles based on comparing the bundle dimension score for the promotion bundle and one or more other bundle dimension scores associated with one or more other promotion bundles.

2. The apparatus of claim 1, wherein the circuitry is further configured to receive an indication of the bundle limit value from the consumer device.

3. The apparatus of claim 1, wherein the bundle limit value defines a constraint on one or more of:
   a price dimension value;
   a time dimension value;
   a location dimension value;
   an environmental dimension value; or
   a consumer preference dimension value.

4. The apparatus of claim 1, wherein the circuitry is further configured to:
   determine available items for inclusion within a promotion bundle;
   determine, based on the available items, one or more items of the promotion bundle;
   determine the bundle limit value defining a constraint on the dimension value of each of the one or more promotions and each of the one or more items;
   determine one or more items of the promotion bundle, wherein the dimension value of each of the one or more items and the one or more promotions collectively fail to exceed the bundle limit value;
   determine a bundle dimension score for the promotion bundle based on determining a multi-dimension score associated with each of the one or more promotions and the one or more items; and
   determine a ranking of promotion bundles based on comparing the bundle dimension score for the promotion bundle and one or more other bundle dimension scores associated with one or more other promotion bundles.

5. The apparatus of claim 1, wherein the circuitry is further configured to:
   generate an impression including one or more promotion bundles based on the ranking of the promotion bundles; and
   provide the impression to the consumer device.

6. The apparatus of claim 1, the apparatus further configured to:
   receive, from a first computing device associated with a merchant device, first consumer activity data associated with one or more consumer interactions with the merchant device;
   receive, from a consumer device, second consumer activity data associated with one or more interactions with a consumer device;
   synthesize the first consumer activity data and the second consumer activity data to generate at least one consumer persona embodying consumer preferences data; and
   determine one or more relevant promotions based on the consumer preferences data, wherein the one or more relevant promotions embodies the available promotions for inclusion within the promotion bundle.

7. The apparatus of claim 1, the apparatus further configured to:
   receive an indication that a consumer device is within a determined proximity associated with a communication beacon in real-time, the communication beacon associated with first location data, wherein the one or more promotions of the promotion bundle is determined based at least on a location dimension score generated based on a comparison between the first location data and a location dimension value for each of the one or more promotions.

8. A machine-implemented method, comprising, by processing circuitry of an apparatus:
   determining available promotions for inclusion within a promotion bundle;

determining, based on the available promotions, one or more promotions of the promotion bundle;
determining a bundle limit value defining a constraint on a dimension value of each of the one or more promotions;
determining one or more promotions of the promotion bundle, wherein the dimension value of each of the one or more promotions collectively fail to exceed the bundle limit value;
tracking, using a machine learning process, consumer responses to one or more impressions previously provided to at least one consumer;
for each particular promotion of the one or more promotions of the promotion bundle;
  determining one or more dimension scores of the particular promotion, the one or more dimension scores corresponding to each dimension value of a set of dimension values associated with the particular promotion;
  determining, using the machine learning process, a weighting value for each of the one or more dimension scores that maximizes a parameter of a consumer response to the particular promotion;
  generating a multi-dimension score for the particular promotion based on at least the weighting values and the one or more dimension scores for the particular promotion; and
determining a bundle dimension score for the promotion bundle based on the multi-dimension score for each of the one or more promotions of the promotion bundle; and
determining a ranking of promotion bundles based on comparing the bundle dimension score for the promotion bundle and one or more other bundle dimension scores associated with one or more other promotion bundles.

9. The method of claim 8 further comprising, by the processing circuitry, receiving an indication of the bundle limit value from the consumer device.

10. The method of claim 8, wherein the bundle limit value defines a constraint on one or more of:
a price dimension value;
a time dimension value;
a location dimension value;
an environmental dimension value; or
a consumer preference dimension value.

11. The method of claim 8 further comprising, by the processing circuitry:
determining available items for inclusion within a promotion bundle;
determining, based on the available items, one or more items of the promotion bundle;
determining the bundle limit value defining a constraint on the dimension value of each of the one or more promotions and each of the one or more items;
determining one or more items of the promotion bundle, wherein the dimension value of each of the one or more items and the one or more promotions collectively fail to exceed the bundle limit value;
determining a bundle dimension score for the promotion bundle based on determining a multi-dimension score associated with each of the one or more promotions and the one or more items; and
determining a ranking of promotion bundles based on comparing the bundle dimension score for the promotion bundle and one or more other bundle dimension scores associated with one or more other promotion bundles.

12. The method of claim 8 further comprising, by the processing circuitry:
generating an impression including one or more promotion bundles based on the ranking of the promotion bundles; and
providing the impression to the consumer device.

13. The machine-implemented method of claim 8, the machine-implemented method further comprising:
receiving, from a first computing device associated with a merchant device, first consumer activity data associated with one or more consumer interactions with the merchant device;
receiving, from a consumer device, second consumer activity data associated with one or more interactions with a consumer device;
synthesizing the first consumer activity data and the second consumer activity data to generate at least one consumer persona embodying consumer preferences data; and
determining one or more relevant promotions based on the consumer preferences data, wherein the one or more relevant promotions embodies the available promotions for inclusion within the promotion bundle.

14. The machine-implemented method of claim 8, the machine-implemented method further comprising:
receiving an indication that a consumer device is within a determined proximity associated with a communication beacon in real-time, the communication beacon associated with first location data, wherein the one or more promotions of the promotion bundle is determined based at least on a location dimension score generated based on a comparison between the first location data and a location dimension value for each of the one or more promotions.

15. A computer program product comprising at least one non-transitory computer readable storage medium having computer program instructions thereon, the computer program instructions, in execution with a processor, configured for:
determining available promotions for inclusion within a promotion bundle;
determining, based on the available promotions, one or more promotions of the promotion bundle;
determining a bundle limit value defining a constraint on a dimension value of each of the one or more promotions;
determining one or more promotions of the promotion bundle, wherein the dimension value of each of the one or more promotions collectively fail to exceed the bundle limit value;
tracking, using a machine learning process, consumer responses to one or more impressions previously provided to at least one consumer;
for each particular promotion of the one or more promotions of the promotion bundle:
  determining one or more dimension scores of the particular promotion, the one or more dimension scores corresponding to each dimension value of a set of dimension values associated with the particular promotions;
  determining, using the machine learning process, a weighting value for each of the one or more dimension scores that maximizes a parameter of a consumer response to the particular promotion;

generating a multi-dimension score for the particular promotion based on at least the weighting values and the one or more dimension scores for the particular promotion; and determining a bundle dimension score for the promotion bundle based on the multi-dimension score for each of the one or more promotions of the promotion bundle; and determining a ranking of promotion bundles based on comparing the bundle dimension score for the promotion bundle and one or more other bundle dimension scores associated with one or more other promotion bundles.

16. The computer program product of claim 15, the computer program product further configured for receiving an indication of the bundle limit value from the consumer device.

17. The computer program product of claim 15, wherein the bundle limit value defines a constraint on one or more of:
   a price dimension value;
   a time dimension value;
   a location dimension value;
   an environmental dimension value; or
   a consumer preference dimension value.

18. The computer program product of claim 15, the computer program product further configured for:
   determining available items for inclusion within a promotion bundle;
   determining, based on the available items, one or more items of the promotion bundle;
   determining the bundle limit value defining a constraint on the dimension value of each of the one or more promotions and each of the one or more items;
   determining one or more items of the promotion bundle, wherein the dimension value of each of the one or more items and the one or more promotions collectively fail to exceed the bundle limit value;
   determining a bundle dimension score for the promotion bundle based on determining a multi-dimension score associated with each of the one or more promotions and the one or more items; and
   determining a ranking of promotion bundles based on comparing the bundle dimension score for the promotion bundle and one or more other bundle dimension scores associated with one or more other promotion bundles.

19. The computer program product of claim 15, the computer program product further configured for:
   generating an impression including one or more promotion bundles based on the ranking of the promotion bundles; and
   providing the impression to the consumer device.

20. The computer program product of claim 15, the computer program product further configured for:
   receiving, from a first computing device associated with a merchant device, first consumer activity data associated with one or more consumer interactions with the merchant device;
   receiving, from a consumer device, second consumer activity data associated with one or more interactions with a consumer device;
   synthesizing the first consumer activity data and the second consumer activity data to generate at least one consumer persona embodying consumer preferences data; and
   determining one or more relevant promotions based on the consumer preferences data, wherein the one or more relevant promotions embodies the available promotions for inclusion within the promotion bundle.

* * * * *